(12) United States Patent
Covell

(10) Patent No.: US 7,072,525 B1
(45) Date of Patent: Jul. 4, 2006

(54) ADAPTIVE FILTERING OF VISUAL IMAGE USING AUXILIARY IMAGE INFORMATION

(75) Inventor: Michele M. Covell, Los Altos Hills, CA (US)

(73) Assignee: YesVideo, Inc., Santa Clara, CA (US)

( * ) Notice: Subject to any disclaimer, the term of this patent is extended or adjusted under 35 U.S.C. 154(b) by 658 days.

(21) Appl. No.: 10/077,832

(22) Filed: Feb. 15, 2002

Related U.S. Application Data

(60) Provisional application No. 60/269,595, filed on Feb. 16, 2001.

(51) Int. Cl.
*G06K 9/40* (2006.01)

(52) U.S. Cl. .................. 382/261; 382/263; 382/264

(58) Field of Classification Search ................ 382/261, 382/263, 264
See application file for complete search history.

(56) References Cited

U.S. PATENT DOCUMENTS

| | | | | |
|---|---|---|---|---|
| 5,647,023 | A * | 7/1997 | Agazzi et al. ............. | 382/209 |
| 6,335,990 | B1 * | 1/2002 | Chen et al. ................ | 382/261 |
| 6,571,142 | B1 * | 5/2003 | Kondo et al. .............. | 700/90 |
| 6,594,400 | B1 * | 7/2003 | Kim ........................... | 382/268 |
| 6,744,929 | B1 * | 6/2004 | Okada ........................ | 382/251 |
| 6,823,086 | B1 * | 11/2004 | Dolazza ..................... | 382/261 |

OTHER PUBLICATIONS

Hou et al., Orientation Selective Operators for Ridge, Valley, Edge, and Line Detection in Imagery, Acoustics, Speech, and Signal Processing, 1994. ICASSP-94., 1994 IEEE International Conference on, vol.: V, Apr. 19-22, 1994, pp.:V/25-V/28 vol. 5.*

Freeman, William T. and Adelson, Edward H, "The Design and Use of Steerable Filters," IEEE Trans. Patt. Anal. and Machine Intell., vol. 13, No. 9, pp. 891-906, Sep. 1991.

Simoncelli, Eero P. and Freeman, William T., "The Steerable Pyramid: A Flexible Architecture for Multi-Scale Derivative Computation," 2nd Annual IEEE International Conference on Image Processing, Washington, D.C., Oct., 1995.

* cited by examiner

*Primary Examiner*—Joseph Mancuso
*Assistant Examiner*—Dennis Rosario
(74) *Attorney, Agent, or Firm*—David R. Graham

(57) ABSTRACT

An adaptive filter is used to filter a target version of a visual image that is produced by processing an original version of the visual image, the characteristics of the adaptive filter being determined in accordance with one or more characteristics of the original version of the visual image. The orientation and/or strength of filtering of the adaptive filter can be adjusted based on local properties of the original image, which can enable the adaptive filter to avoid introducing blurring across true edges in an image.

35 Claims, 1 Drawing Sheet

ADAPTIVE FILTERING OF VISUAL IMAGE USING AUXILIARY IMAGE INFORMATION

This application claims benefit of No. 60/269,595 filed Feb. 16, 2001.

BACKGROUND OF THE INVENTION

1. Field of the Invention

This invention relates to visual image processing and, in particular, to adaptive filtering of a visual image. Most particularly, the invention relates to adaptively filtering a target version of a visual image produced by processing an original version of the visual image, where the adaptation of the filtering is based on one or more characteristics of the original visual image (the control image).

2. Related Art

In visual image processing, it is often necessary or desirable to filter a visual image to remove undesirable artifacts (e.g., adaptive-gain noise, upsampling artifacts, compression artifacts) from the image. Such artifacts may be present in a visual image as originally obtained or can be introduced into a visual image by previous processing of the image. For example, a decompressed visual image produced from an MPEG or JPEG compressed image can include blocking artifacts and intrablock directional noise introduced by the compression. Or, for example, an upsampled visual image can include blocking artifacts introduced by an upsampling filter. Or, for example, a visual image that has undergone brightness equalization can include pixel noise in high gain areas of the processed image.

An adaptive filter can be used to mitigate artifacts in a visual image that have been introduced by previous processing of the visual image. In an adaptive filter, the operation of the filter can vary in accordance with a characteristic of a version of the visual image being filtered. Herein, the version of a visual image used to control the adaptation of an adaptive filter used to filter the image is referred to as the "control" version of the visual image or the "control image."

An adaptive filter has been implemented so that the adaptive filter is directionally adaptive (i.e., the orientation of the filter with respect to the visual image can change). However, as discussed in more detail below, it can be advantageous for an adaptive filter to have other adaptation characteristics.

Previously, the adaptation of an adaptive filter has been controlled in accordance with a characteristic of the version of the visual image being filtered (which is sometimes referred to herein as the "target" version of the visual image or the "target image"), i.e., the target image is the control image. However, artifacts introduced into the target version of the visual image by previous processing of the visual image can adversely affect the adaptive filtering. For example, if the target image is an upsampled visual image, the directionality of an adaptive filter applied to the target image can be adversely affected by blocking artifacts introduced into the target image by the upsampling (this is particularly so when a simple upsampling method is used, such as pixel replication). As discussed in more detail below, it can be advantageous for the adaptation of an adaptive filter to be dependent on a version of a visual image other than the target version of the visual image.

SUMMARY OF THE INVENTION

According to the invention, an adaptive filter is used to filter a target version of a visual image that is produced by processing an original version of the visual image, the characteristics of the adaptive filter being determined in accordance with one or more characteristics of the original version of the visual image. The orientation and/or strength of filtering of the adaptive filter can be adjusted based on local properties of the original image, which can enable the adaptive filter to avoid introducing blurring across true edges in an image. For example, the original image can be filtered and the filtered original image compared to the original image, the filtering of the target image being controlled in accordance with a difference, if any, between the filtered original image and the original image.

An adaptive filter according to the invention can be produced by combining the output of a multiplicity of directional filters. In one embodiment of the invention, an adaptive filter includes between 4 and 32, inclusive, directional filters. In a more particular embodiment of the invention, the adaptive filter includes an even number of directional filters. In an even more particular embodiment of the invention, the adaptive filter includes 8 directional filters. The directional filters can be oriented symmetrically or asymmetrically with respect to each other. In one particular implementation, the directional filters can include a 5×5 array of filter weights. In another particular implementation, the directional filters have non-zero filter weights along a single direction and zero filter weights everywhere else. An adaptive filter according to the invention can also be implemented using steerable filters and/or variable size filters.

The output of each of the directional filters can be weighted in accordance with a characteristic of the original image and weighted outputs combined to produce the adaptive filter output. The weight for each directional filter can be established in accordance with a prediction error between an original version of the visual image filtered by the directional filter and the original version of the visual image. In particular, the weight can be established in accordance with a difference between the prediction error for the directional filter and a minimum prediction error (e.g., the smallest prediction error from all of the directional filters). The weight can be established so that the directional filter operates as a low pass filter when the difference between the prediction error for that directional filter and a minimum prediction error is below a specified magnitude, and as a high pass filter when the difference between the prediction error for that directional filter and a minimum prediction error is above a specified magnitude. The combined weighted output from the directional filters can be combined with the average of the outputs from all of the directional filters. Further, the averaged output and the weighted outputs from all of the directional filters can be combined in accordance with the characteristic of the original image. In particular, the averaged output and the weighted outputs from all of the directional filters can be combined in accordance with a difference between a prediction error for the averaged directional filter output and a minimum prediction error (e.g., the smallest prediction error from all of the directional filters).

An adaptive filter according to the invention can be used to filter an image that has been processed in any manner, e.g., upsampled, compressed/decompressed, brightness equalized, and reduce or mitigate artifacts (e.g., adaptive-gain noise, upsampling artifacts, compression artifacts) introduced by such processing (as well as artifacts that were present in the image prior to processing). An adaptive filter according to the invention can produce a filtered target image that is superior to the filtered target image produced by previous adaptive filters. In particular, the adaptive filtering in accordance with the invention takes advantage of the fact that, notwithstanding the reduction of artifact(s) that can be introduced into a visual image by processing an original version of the visual image to produce a target version of the visual image, the original version of the visual image often provides a better estimate of the edge structure within the visual image than does the target image.

DETAILED DESCRIPTION OF THE INVENTION

According to the invention, a version of a visual image that is produced by processing another version of the visual image (which itself may or may not have been produced by processing of still another version of the visual image) is filtered using an adaptive filter in which the characteristics of the adaptive filter are determined in accordance with one or more characteristics of the version of the visual image before processing. Herein, the version of the visual image before being processed is referred to as the "original" version of the visual image or the "original image." The version of the visual image after being processed is referred to herein as the "processed" or "target" version of the visual image or the "processed image" or "target image." The version of the visual image after being filtered in accordance with the invention by an adaptive filter is referred to herein as the "filtered target" version of the visual image or the "filtered target image."

Figure 1A:
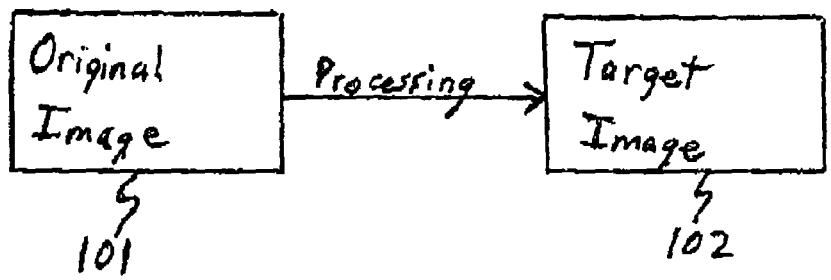
FIG. 1A is a block diagram illustrating processing of an original version of a visual image to produce a target version of the visual image.
Figure 1B:
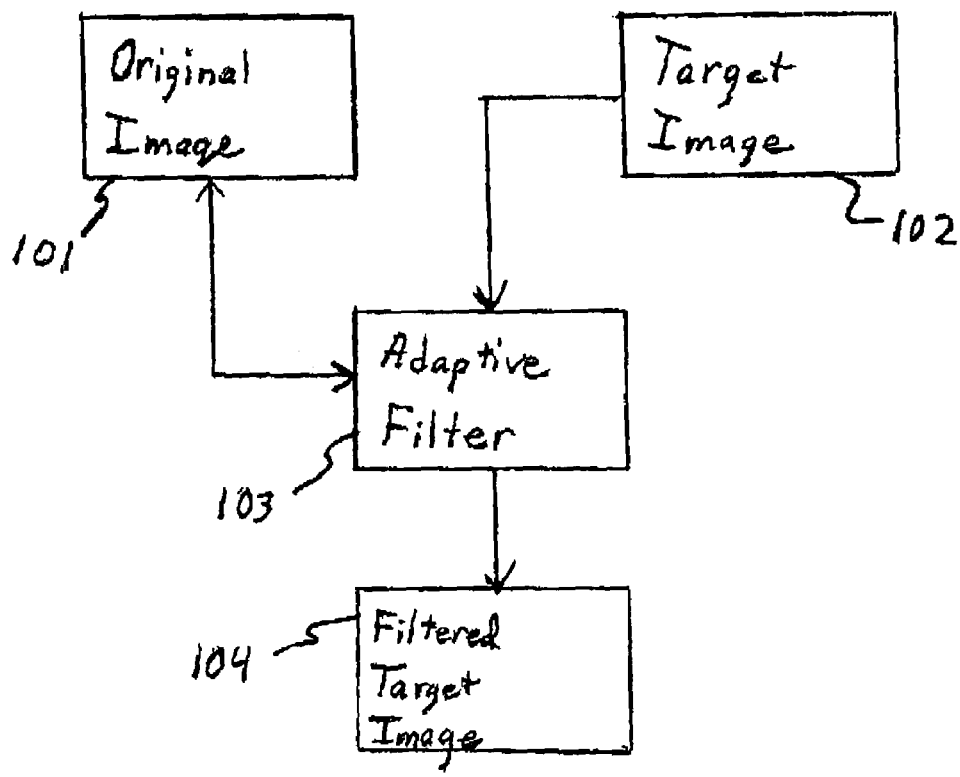
FIG. 1B is a block diagram illustrating the use of adaptive filtering according to the invention to produce a filtered target image from the target image of FIG. 1A.

FIGS. 1A and 1B illustrate application of the invention to a visual image. In FIG. 1A, an original version of a visual image (original image 101) is processed to produce a target version of the visual image (target image 102). In FIG. 1B, an adaptive filter 103 processes the target image 102 to produce a filtered target version of the visual image (filtered target image 104). The adaptive filter 103 evaluates the original image 101 and modifies the filtering to be performed on the target image 102 in accordance with one or more characteristics of the original image 101. In particular, the adaptive filter 103 can, for each location (e.g., pixel location) in the target image 102 that is filtered by the adaptive filter 103, evaluate the original image 101 at a corresponding location and modify the filtering to be performed at that location of the target image 102 in accordance with one or more characteristics of the original image 101 at the corresponding location in the original image 101. For example, a filter can be used to filter the original image 101 to produce a filtered original image that is then compared to the original image 101, the filter then being used to filter the target image 102, with the operation of the filter being controlled in accordance with the results of the comparison of the filtered original image to the original image 101.

Thus, according to the invention, a target image is filtered to produce a filtered target image using an adaptive filter in which the adaptation of the adaptive filter depends on the original image, i.e., the original image is the control image for the adaptive filter. As discussed above, previously, when an adaptive filter has been used to filter a target image to produce a filtered target image, the adaptation of the adaptive filter has depended on the target image, i.e., the target image has been the control image for the adaptive filter. An adaptive filter according to the invention can produce a filtered target image that is superior to the filtered target image produced by previous adaptive filters. In particular, the adaptive filtering in accordance with the invention takes advantage of the fact that, notwithstanding the reduction of artifact(s) that can be introduced into a visual image by processing an original version of the visual image to produce a target version of the visual image, the original version of the visual image often provides a better estimate of the edge structure within the visual image than does the target image.

The adaptive filtering according to the invention can be applied to any type of visual image obtained in any manner. For example, the adaptive filtering according to the invention can be applied to a visual image acquired by a still image camera, a video camera or a motion picture camera. The adaptive filtering according to the invention can be applied to a monochrome visual image or a color visual image. The adaptive filtering according to the invention can be applied to an analog visual image or a digital visual image; however, an analog visual image must be converted to digital form (which can readily be accomplished using conventional methods and apparatus) prior to application of the adaptive filtering according to the invention.

In general, the adaptive filtering according to the invention can be applied to a visual image that has undergone any type of processing that has introduced undesirable artifacts into the visual image. For example, the adaptive filtering according to the invention can be applied to a target image that is produced by upsampling (using simple pixel replication or other upsampling technique). In such case, the original image which is used to control the adaptive filter can be the image as it exists prior to the upsampling. In particular, the adaptive filtering according to the invention can mitigate (i.e., reduce or eliminate) blocking artifacts introduced into the visual image by an upsampling filter. Often, an original image to be upsampled has been produced by decompressing a compressed image. In that case, the original image (i.e., the control image) which is used to control the adaptive filter is the image that is output from the decoder that performs the decompression. The compression/decompression process (e.g., MPEG or JPEG compression/decompression) can introduce blocking and intrablock directional noise into the visual image. The adaptive filtering according to the invention can also mitigate artifacts present in an upsampled image from prior compression/decompression. An adaptive filter according to the invention has been used to create a high quality 1.3 megapixel image from an MPEG compressed image represented by only 84K pixels).

The adaptive filtering according to the invention can also be applied to a target image that is produced by performing brightness equalization. In such case, the original image which is used to control the adaptive filter can be the unequalized image as it exists prior to brightness equalization. In particular, the adaptive filtering according to the invention can mitigate pixel noise in high gain areas of the brightness equalized target image.

The adaptive filtering to the invention can also be applied to a target image that is produced by decompressing a compressed image. In such case, the original image which is used to control the adaptive filter can be the image before compression ("pre-compression image"). However, once the pre-compression image will be unavailable at the time of filtering the decompressed image (otherwise, the pre-compression image would be used directly), the invention is implemented so that the pre-compression image is evaluated to produce information for use in controlling the adaptive filtering and that information is combined with the compressed image such that the information can be extracted after decompression and used to control the adaptive filtering.

The adaptive filtering according to the invention can also be applied to a target image that is produced by performing both upsampling and brightness equalization. Additionally, in such case, the original image may or may not be a decompressed image. Generally, the adaptive filtering according to the invention can be applied to a target image that is produced from an original image by performing any number and/or types of processing operations. Further, generally, the original image can itself have been produced by performing any number and/or types of processing operations on an earlier version of a visual image.

An adaptive filter according to the invention can be applied to a visual image represented in a variety of ways (so long as the representation is digital). As indicated above, the visual image can be monochrome or color. Further, a color visual image can be represented using any of a variety of color representations (e.g., RGB, CMYK). Additionally, as discussed further below, an adaptive filter according to the invention can be applied to a color visual image by first converting the color representation of the image to a grayscale representation of the image (e.g., by combining the RGB components of a color visual image). The visual image can be represented with any number of pixels, and each pixel (and each color component of the pixel, if a color visual image) can have any number of gradations of color (e.g., 256 or 65,536).

When the invention is used to adaptively filter a color visual image, it can be advantageous to apply the adaptive filtering of the invention to a grayscale representation of the image, since it is less computationally expensive to apply the adaptive filtering to the grayscale version of the image and reconstruct a color version of the filtered grayscale version of the image than it is to apply the adaptive filtering to the color components of the image directly and combine the filtered color components of the image into a color filtered version of the image. For example, when applying an adaptive filter according to the invention to an upsampled color visual image, it is less computationally expensive to apply the adaptive filter to a grayscale version of the target image (the upsampled image) and then combine that filtered grayscale version of the image with a simple non-adaptively upsampled (e.g., produced using bilinear interpolation or pixel replication) version of the color information from the original image to produce a filtered color version of the image. The color information can be represented, for example, by a normalized value of each color component for each pixel of the unfiltered image, the grayscale value for each pixel of the filtered grayscale version of the image being multiplied by corresponding upsampled normalized color values to produce the filtered color version of the image. (The upsampled normalized color values can be produced either by upsampling the color components of each pixel of the original image, then normalizing the upsampled color values, or by normalizing the color components of each pixel of the original image, then upsampling the normalized color components.) Combining a filtered grayscale version of an upsampled color image with a simple non-adaptively upsampled version of the color information has been found to not introduce any visible artifacts.

As explained in more detail below, an adaptive filter according to the invention can be implemented as a composite adaptive filter produced by combining the output from a multiplicity of directional filters (e.g., 8 directional filters). In particular, an adaptive filter according to the invention can be implemented by combining the output from a multiplicity of directional filters such that a first part of the combined output corresponds to the output from a directional "ridge" filter (i.e., a filter that is low-pass in one or a relatively small number of directions of the directional filters, and high pass in all other directions of the directional filters) and a second part of the combined output corresponds to the output from a single (largely) non-directional filter, i.e., the adaptive filter can be represented as the combination of the ridge filter and the non-directional filter. Further, as described in more detail below, such an implementation of an adaptive filter according to the invention (i.e., a combination of a ridge filter and a non-directional filter) can be implemented to be adaptive in one or both of two ways: 1) the orientation of the ridge filter can be varied and 2) the manner of combination of the ridge filter and the non-directional filter can be varied. The adaptive filter can be implemented so that the adaptive orientation of the ridge filter and the adaptive combination of the output from the ridge filter with the output from the non-directional filter can be determined at each pixel.

In general, any number and size of directional filters can be used to implement an adaptive filter according to the invention. The particular number and/or size of directional filters used can be chosen in view of tradeoffs associated with increasing or decreasing the number and/or size of filters used. For example, increasing the size of the directional filters used may result in the filter output including contributions from pixels that are unrelated to the pixel being filtered, thereby distorting the filter output (e.g., for a low pass filter, increasing the fuzziness of the filtered image). Further, while increasing the number of the directional filters used can increase the effectiveness of an adaptive filter according to the invention in detecting and filtering edges in the visual image (when the size of the directional filters is held constant), increasing the number of directional filters used may necessitate using larger filters (in order to obtain distinguishable filters), which can be disadvantageous as discussed above. Additionally, increasing the number and/or size of the directional filters can increase the computational cost of the filtering operation performed by an adaptive filter according to the invention. On the other hand, decreasing the size of the directional filters may result in noisier filter output. Additionally, decreasing the number of directional filters used increases the likelihood that none of the filters will be oriented to filter parallel (or nearly parallel) to an edge in the visual image, thus resulting in an output from the adaptive filter that produces a relatively blurrier visual image.

In one embodiment, an adaptive filter according to the invention is implemented using a number of directional filters between 4 and 32 inclusive. In a further embodiment, an adaptive filter according to the invention is implemented using an even number of directional filters between 4 and 32 inclusive. In a particular embodiment, an adaptive filter according to the invention is implemented using 8 directional filters. Though it is anticipated that, typically, an even number of directional filters will be used, this is not necessary. Further, when an even number of directional filters is used, the orientations of the directional filters may, but need not necessarily be, symmetric with respect to each other. In another embodiment, an adaptive filter according to the invention includes directional filters comprised of a 5×5 array of filter weights. In a particular embodiment, an adaptive filter according to the invention is implemented using 8 directional filters that are each comprised of a 5×5 array of filter weights. The particular number and size of filters used can depend on the nature of the images that it is anticipated will be processed using an adaptive filter according to the invention and/or the application for which an adaptive filter according to the invention is to be used.

It is desirable to implement the directional filters so that each directional filter has non-zero filter weight along a single direction and a zero filter weight everywhere else, thus producing a filter which is low pass or high pass in that direction and all-pass in all other directions. This enables the directional filters to be combined to produce an adaptive filter having the characteristics of a combination of a ridge filter and a non-directional filter, as discussed elsewhere herein.

One or more (e.g., all) of the directional filters can be implemented as a steerable directional filter, i.e., a directional filter for which the orientation can vary from pixel to pixel of the image to which the directional filter is applied. The construction and operation of steerable directional filters as can be used in an adaptive filter according to the invention is described in more detail in "The Design and Use of Steerable Filters," by William T. Freeman et al., IEEE Transactions Pattern Analysis and Machine Intelligence, Vol. 13, No. 9, pp. 891–906, September 1991, the disclosure of which is incorporated by reference herein. Further, the directional filters can be operated at multiple scales as described in "The Steerable Pyramid: A flexible architecture for multi-scale derivative computation", by Simoncelli and Freeman, 2nd IEEE International Conference on Image Processing, Washington, D.C., October 1995.

As indicated above, an adaptive filter according to the invention can be implemented so that the adaptive filter constitutes a combination of a ridge filter and a non-directional filter. The ridge filter of the adaptive filter can be constructed adaptively so that, for each of the directional filters, whether the directional filter operates as a low pass filter or high pass filter depends on one or more characteristics of the original version of the visual image. The ridge filter of the adaptive filter can also be constructed adaptively so that, for each of the directional filters, the strength of the directional filter (i.e., the effect of the directional filter on the filtering of the target image) depends on one or more characteristics of the original version of the visual image. These attributes of the directional filters can be controlled by assigning an appropriate weight to the output of each directional filter when applied to the target image, as illustrated in more detail below. The ability to vary the weights assigned to the directional filters enables variation in the orientation of the ridge filter, thereby providing one type of adaptiveness of the adaptive filter.

For example, the ridge filter can be created by combining the output of the multiplicity of directional filters when applied to a pixel of a target image according to how well each directional filter predicts the value of a corresponding pixel in an original image. The prediction error, $e_i$, for the $i^{th}$ directional filter when applied to pixel x of an original image is given by the following equation:

$$e_i = x_{i,o} - x_o \quad (1)$$

where $x_{i,o}$ is the output from the $i^{th}$ directional filter when applied to pixel x of the original image and $x_o$ is the value of pixel x in the original image. According to an embodiment of the invention (a particular instantiation of which is described in detail below), the ridge filter is implemented so that each directional filter can be used as either a one-dimensional low pass filter or high pass filter (i.e., low or high pass in one direction and all-pass in all other directions), depending upon the magnitude of the prediction error, $e_i$, for that directional filter when applied to the original image. Additionally, according to an embodiment of the invention (again, a particular instantiation of which is described in detail below), the strength of each directional filter when applied to the target image also depends on the magnitude of the prediction error for that directional filter when applied to the original image.

In a particular embodiment of the ridge filter, whether a directional filter operates as a low pass or a high pass filter for a particular pixel x depends upon the difference between the prediction error, $e_i$, for that directional filter at the pixel x in the original image and a minimum prediction error, $e_{min}$, for the pixel x in the original image. In a more particular embodiment, whether a directional filter operates as a low pass or a high pass filter for a particular pixel x can depend upon the difference between the squared prediction error of the directional filter, $e_i^2$, and the squared minimum prediction error, $e_{min}^2$. For example, when the directional filter has a prediction error, $e_i$, that is sufficiently near the minimum prediction error, $e_{min}$, the directional filter operates as a low pass filter. Conversely, if the directional filter has a prediction error, $e_i$, that is sufficiently different from the minimum prediction error, $e_{min}$, the directional filter operates as a high pass filter. (See equation (3) below.) When a prediction error, $e_i$, is small (i.e., close to $e_{min}$), then either there is no edge at that location in the visual image or the filter is likely aligned (or nearly aligned) with an edge. In that case, it is desirable to low pass filter to reduce noise energy. On the other hand, when a prediction error, $e_i$, is large (i.e., far from $e_{min}$), then the filter is likely perpendicular (or nearly perpendicular) to an edge. In that case, it is desirable to high pass filter to sharpen the edge. Embodying the ridge filter as described above provides these effects.

Further, in a particular embodiment of the ridge filter, the strength (i.e., the magnitude of the weight given to the directional filter) of each directional filter can depend on the degree to which the prediction error, $e_i$, for the directional filter when applied to the pixel x of the original image differs from a minimum prediction error, $e_{min}$, for the pixel x of the original image (see, e.g., equation (3) below). For example, the weight assigned to each of the directional filters can be proportional to the difference between the squared prediction error of the directional filter, $e_i^2$, and the squared minimum prediction error, $e_{min}^2$. In a particular embodiment of an adaptive filter according to the invention described below, the proportionality varies with the magnitude of the difference.

The minimum prediction error, $e_{min}$, can be established as the minimum prediction error among the prediction errors for all of the directional filters when applied to the pixel x in the original image. Alternatively, the minimum prediction error, $e_{min}$, can be established as the minimum prediction error among the prediction errors for all of the directional filters and the non-directional filter when applied to the pixel x in the original image.

The non-directional filter can be created by averaging the outputs from the directional filters. The number of directional filters and/or the particular implementation of the directional filters can affect the non-directionality of the non-directional filter. However, in practice it has been found that the degree of non-directionality of the non-directional filter does not greatly impact the output of the adaptive filter.

The output of the ridge filter and the output of the non-directional filter are combined to produce the overall output of the adaptive filter. In particular, the output of the ridge filter and the output of the non-directional filter can be adaptively combined. For example, the output of the ridge filter and the output of the non-directional filter can be combined for each pixel according to how well the non-directional filter predicts the value of that pixel in an original image. The prediction error, $e_0$, for the non-directional filter when applied to pixel x of an original image is given by the following equation:

$$e_0 = \sum_{i=1}^{N} (x_{i,o}/N) - x_o \quad (2)$$

where, as indicated above, $x_{i,o}$ is the output from the $i^{th}$ directional filter when applied to pixel x of the original image and $x_o$ is the value of pixel x in the original image. In a particular embodiment of an adaptive filter according to the invention, the output of the ridge filter and the output of the non-directional filter can be combined in accordance with the degree to which the prediction error, $e_0$, for the non-directional filter differs from a minimum prediction error, $e_{min}$. (The minimum prediction error, $e_{min}$, can be established as discussed above.) For example, the output of the ridge filter and the output of the non-directional filter can be combined in accordance with the difference between the squared prediction error of the non-directional filter, $e_0^2$, and the squared minimum prediction error, $e_{min}^2$.

Following is a description of a particular embodiment of an adaptive filter according to the invention, illustrating in detail the principles of the invention discussed above. The adaptive filter described below is formed by combining the outputs from multiple directional low pass filters. In this embodiment of an adaptive filter according to the invention, a ridge filter component of the adaptive filter is created by assigning a weight, $W_i$, to the output of each directional filter in accordance with the following equation:

$$W_i = \begin{cases} 1 - (e_i^2 - e_{min}^2)/s & \text{if } e_i^2 - e_{min}^2 \le s \\ \frac{1}{2}[1 - (e_i^2 - e_{min}^2)/s] & \text{if } s \le e_i^2 - e_{min}^2 \le s + s/N \\ -1/(2N) & \text{otherwise} \end{cases} \quad (3)$$

where $e_i$ is the prediction error for the $i^{th}$ directional filter when applied to a pixel in the original image and $e_{min}$ is a minimum prediction error for that pixel in the original image (as discussed above), N is the number of directional filters, and s is a constant that affects how many of the directional filters are used as low-pass filters and how quickly the transition occurs from directional filters that operate as low pass filters to directional filters that operate as high pass filters. The constant s can be established empirically based on use of an adaptive filter according to the invention on one or more test images.

As can be appreciated from equation (3), a directional filter is used as a low pass filter when $e_i^2 - e_{min}^2 < s$ (i.e., a positive weight is assigned to the filter output) and as a high pass filter when $e_i^2 - e_{min}^2$) s (i.e., a negative weight is assigned to the filter output). When $e_{min}$ is chosen as the smallest of the directional filter prediction errors, at least one directional filter is always used as a low-pass filter. (Even when $e_{min}$ is chosen as the smallest of the directional filter prediction errors and the non-directional filter error, it will always or nearly always be the case that at least one directional filter is used as a low-pass filter.) The number of additional directional filter(s), if any, that are also used as low-pass filter(s) depends on the magnitude of s: as the magnitude of s decreases, the likelihood of additional directional filter(s) being used as a low pass filter decreases. Generally, in the ridge filter described by equation (3), low pass filtering will occur in a relatively narrow range of directions, while high pass filtering will occur over a relatively broad range of directions.

As can also be appreciated from equation (3), in the above-described implementation of an adaptive filter according to the invention, the directional filters transition, beginning with the low pass filter (the strongest low pass filter if more than one) and successively moving to the next filter having the closest angular orientation, from low pass to increasingly strong high pass operation in each direction. Specifically, when $e_i^2 - e_{min}^2 = 0$, $W_i = 1$, i.e., the corresponding directional filter is used at its full strength as a low pass filter. As $e_i^2 - e_{min}^2$ approaches s, $W_i$ gradually decreases to 0, i.e., corresponding directional filter(s) are used as increasingly weak low pass filters. When $e_i^2 - e_{min}^2$ exceeds s, $W_i$ becomes negative, i.e., corresponding directional filter(s) are used as high pass filters. As $e_i^2 - e_{min}^2$ increases beyond s, $W_i$ becomes increasingly negative, i.e., corresponding directional filter(s) are used as increasingly strong high pass filters. (As can be appreciated from equation (3) above, the strength of high pass filtering as a function of $e_i^2 - e_{min}^2$ increases half as fast as $e_i^2 - e_{min}^2$ increases beyond s as the strength of low pass filtering increases as $e_1^2 - e_{min}^2$ decreases to zero.) However, no matter how large $e_i^2 - e_{min}^2$ becomes, $W_i$ does not increase beyond a specified negative magnitude, i.e., the strength of any directional filter used as a high pass filter is limited to a specified maximum magnitude. The gradual transition of the directional filters between low pass and high pass operation enables the adaptive filter to beneficially filter lines that are oriented between the filter directions, as well as corners and other non-linear shapes, since it is more likely that the low pass filtering will be properly aligned with lines in the image.

A normalization factor, $\alpha$, for the ridge filter is defined by the following equation:

$$\alpha = \sum_{i=1}^{N} W_i \quad (4)$$

The output, $x_{t, ridge}$, of the ridge filter when applied to pixel x of the target image is given by the following equation:

$$x_{t,ridge} = 1/\alpha \sum_{i=1}^{N} W_i x_{i,t} \quad (5)$$

where $x_{i,t}$ is the output from the $i^{th}$ directional filter applied to the target image.

The output, $x_{t, nondir}$, of a non-directional filter component of an adaptive filter according to this embodiment of the invention is given by the following equation:

$$x_{t\_nondir} = 1/N \sum_{i=1}^{N} x_{i,t} \qquad (6)$$

A normalization factor, $\alpha_0$, for the non-directional filter is defined by the following equation:

$$\alpha_0 = 1(e_0^2 - e_{min}^2)/s \text{ if } e_0^2 - e_{min}^2 < s \qquad (7)$$
$$= 0 \qquad \text{otherwise}$$

where $e_0$ is the prediction error for the non-directional filter when applied to a pixel in the original image and $e_{min}$ is a minimum prediction error for that pixel in the original image (as discussed above).

Using the normalization factors $\alpha$ and $\alpha_0$, the outputs of the ridge filter and non-directional filter components of the adaptive filter are adaptively combined according to the following equation:

$$y_t = (\alpha_0 x_{nodir} + \alpha x_{ridge})/(\alpha_0 + \alpha) \qquad (9)$$

An adaptive filter according to the invention can be used to filter an upsampled target image by controlling operation of the adaptive filter at each location in the target image in accordance with a characteristic of an original image (prior to the upsampling) at a location in the original image that corresponds to the location in the target image that is being filtered. An adaptive filter according to the invention used for such an application must account for the fact that the resolution of the target image is greater than that of the original (control) image. For example, as described above, an adaptive filter according to the invention can be implemented so that the adaptation of the adaptive filter is controlled in accordance with the prediction errors, $e_i$, representing the difference between an original image and the output of i directional filters applied to the original image. When used to adaptively filter an upsampled target image, the invention can be implemented so that the prediction errors, $e_i$, for the pixels of the original image are "upsampled" to produce a prediction error that corresponds to each pixel of the target image. This "upsampling" can be done in any appropriate manner, such as, for example, using pixel replication or bilinear interpolation.

In contrast to the approach used in previous adaptive filters, in which the adaptation of the adaptive filter depends on the target version of a visual image, in the embodiments of an adaptive filter according to the invention described above, the adaptation of the adaptive filter depends on prediction errors, $e_i$, which are determined with respect to an original version of a visual image, which is distinct from the target version of the visual image to which the adaptive filter is applied. This can be advantageous because the original version of the visual image often provides a better estimate of the edge structure within the visual image than does the target version of the visual image.

Above an embodiment of an adaptive filter according to the invention has been described as a combination of a ridge filter and a non-directional filter. To facilitate understanding of the invention, the ridge filter and non-directional filter have been described as separate components that are constructed and operated separately. In practice, these components of an adaptive filter according to the invention need not be (and, it is anticipated, typically will not be) constructed and operate separately, but, rather, can be constructed and operate as a single, integral filter in which weights are determined for each directional filter output and used together in one step to create the adaptive filter output $y_t$.

As can be readily appreciated, an adaptive filter according to the invention can be implemented in any computational device (which can be part of a larger apparatus or system) that is programmed (using software and/or firmware) to produce the characteristics of an adaptive filter according to the invention as described herein.

Various embodiments of the invention have been described. The descriptions are intended to be illustrative, not limitative. Thus, it will be apparent to one skilled in the art that certain modifications may be made to the invention as described herein without departing from the scope of the claims set out below.

I claim:

1. A method for adaptively filtering a target version of a visual image that has been produce by processing an original version of the visual image, comprising the steps of:
    filtering the target version of the visual image with each of a plurality of directional filters;
    weighting the output of each of the plurality of directional filters, wherein the step of weighting further comprises the steps of:
        filtering the original version of the visual image with each of the plurality of directional filters;
        comparing, for each directional filter, the filtered original version of the visual image produced by that directional filter to the original version of the visual image; and
        establishing the weight of the output from each directional filter in accordance with the difference between a prediction error for that directional filter and a minimum prediction error, wherein the prediction error is the difference between the filtered original version of the visual image produced by that directional filter and the original version of the visual image; and
    combining the weighted outputs from all of the directional filters to produce a filtered version of the visual image.

2. A method as in claim 1, further comprising the step of upsampling the original version of the visual image to produce the target version of the visual image.

3. A method as in claim 2, wherein the original version of the visual image was produced by decompressing a compressed version of the visual image.

4. A method as in claim 1, wherein the original version of the visual image was produced by decompressing a compressed version of the visual image.

5. A method as in claim 1, further comprising the step of brightness equalizing the original version of the visual image to produce the target version of the visual image.

6. A method as in claim 1, wherein the weight of the output from each directional filter is established so that the directional filter operates as a low pass filter when the difference between the prediction error for that directional filter and a minimum prediction error is below a specified magnitude.

7. A method as in claim 1 wherein the weight of the output from each directional filter is established so that the directional filter operates as a high pass filter when the difference between the prediction error for that directional filter and a minimum prediction error is above a specified magnitude.

8. A method as in claim 1, wherein the minimum prediction error is the smallest prediction error from all of the directional filters.

9. A method for adaptively filtering a target version of a visual image that has been produced by processing an original version of the visual image, comprising the steps of:
identifying a characteristic of the original version of the visual image;
filtering the target version of the visual image with each of a plurality of directional filters;
weighting the output of each of the plurality of directional filters in accordance with the characteristic of the original version of the visual image;
averaging the outputs from all of the plurality of directional filters; and
combining the averaged output with the weighted outputs from all of the directional filters, in accordance with the characteristic of the original version of the visual image, to produce a filtered version of the visual image, wherein the step of combining the with all further comprises the steps of:
filtering the original version of the visual image with each of the plurality of directional filters;
comparing the filtered original version of the visual image to the original version of the visual image; and
combining the averaged output with the weighted outputs in accordance with a prediction error between the filtered original version of the visual image and the original version of the visual image for that directional filter.

10. A method as in claim 9, wherein the averaged output and the weighted outputs are combined in accordance with a difference between the prediction error for the averaged directional filter output and a minimum prediction error.

11. A method as in claim 9, wherein the plurality of directional filters comprises between 4 and 32, inclusive, directional filters.

12. A method as in claim 11, wherein the plurality of directional filters comprises an even number of directional filters.

13. A method as in claim 9, wherein the orientation is of the plurality of directional filters are approximately symmetric with respect to one another.

14. A method as in claim 9, wherein the orientations of the plurality of directional filters are asymmetric with respect to one another.

15. A method as in claim 9, wherein one or more of the plurality of directional filters comprises a steerable filter.

16. A method as in claim 9, wherein one or more of the plurality of directional filters comprises a variable size filter.

17. Apparatus for adaptively filtering a target version of a visual image that has been produced by processing an original version of the visual image, comprising:
means for identifying a characteristic of the original version of the visual image; and
means for filtering the target version of the visual image with each of a plurality of directional filters;
means for weighting the output of each of a plurality of directional filters in accordance with the characteristic of the original version of the visual image;
means for averaging the outputs from all of the plurality of directional filters; and
means for combining the averaged output with the weighted outputs from all of the directional filters, in accordance with the characteristic of the original version of the visual image, to produce a filtered version of the visual image wherein the means for combining further comprises:
means for filtering the original version of the visual image will each of the plurality of directional filters;
means for comparing the filtered original version of the visual image to the original version of the visual image; and
means for combining the averaged output with the weighted outputs in accordance with a prediction error between the filtered original version of the visual image and the original version of the visual image for that directional filter.

18. Apparatus as in claim 17, wherein the plurality of directional filters comprises between 4 and 32, inclusive, directional filters.

19. Apparatus as in claim 18, wherein the plurality of directional filters comprises an even number of directional filters.

20. Apparatus as in claim 19, wherein the plurality of directional filters comprises 8 directional filters.

21. Apparatus as in claim 17, wherein the orientations of the plurality of directional filters are approximately symmetric with respect to one another.

22. Apparatus as in claim 17, wherein the orientations of the plurality of directional filters are asymmetric with respect to one another.

23. Apparatus as in claim 17, wherein at least one of the plurality of directional filters is comprised of a 5×5 array of filter weights.

24. Apparatus as in claim 17, wherein each of the plurality of directional filters has non-zero filter weights along a single direction and zero filter weights everywhere else.

25. Apparatus as in claim 17, wherein one or more of the plurality of directional filters comprises a steerable filter.

26. Apparatus as in claim 17, wherein one or more of the plurality of directional filters comprises a variable size filter.

27. A computer readable medium or media encoded with one or more computer programs for adaptively filtering a target version of a visual image that has been produced by processing an original version of the visual image, comprising:
instructions for identifying a characteristic of the original version of the visual image;
instructions for filtering the target version of the visual image with each of a plurality of directional filters;
instructions for weighting the output of each of a plurality of directional filters in accordance with the characteristic of the original version of the visual image;
instructions for averaging the outputs from all of the plurality of directional filters; in
instructions for combining the averaged output with the weighted outputs from all of the directional filters, in accordance with the characteristic of the original version of the visual image, to produce a filtered version of the visual image, wherein the instructions for combining further comprise:
instructions for filtering the original version of the visual image with each of the plurality of directional filters;
instructions for comparing the filtered original version of the visual image to the original version of the visual image; and
instructions for combining the averaged outputs with the weighted outputs in accordance with a prediction error between the filtered original version of the visual image and the original version of the visual image for that directional filter.

28. A computer readable medium or media as in claim 27, wherein the plurality of directional filters comprises between 4 and 32, inclusive, directional filters.

29. A computer readable medium or media as in claim 28, wherein the plurality of directional filters comprises an even number of directional filters.

30. A computer readable medium or media as in claim 27, wherein the orientations of the plurality of directional filters are approximately symmetric with respect to one another.

31. A computer readable medium or media as in claim 27, wherein the orientations of the plurality of directional filters are asymmetric with respect to one another.

32. A computer readable medium or media as in claim 27, wherein one or more of the plurality of directional filters comprises a steerable filter.

33. A computer readable medium or media as in claim 27, wherein one or more of the plurality of directional filters comprises a variable size filter.

34. A computer readable medium or media encoded with one or more computer programs for adaptively filtering a target version of a visual image that has been produced by processing an original version of the visual image, comprising:
   instructions for filtering the target version of the visual image with each of a plurality of directional filters;
   instructions for weighting the output of each of the plurality of directional filters, wherein the instructions for weighting further comprise:
      instructions for filtering the original version of the visual image with each of the plurality of directional filters;
      instructions for comparing, for each directional filter, the filtered original version of the visual image produced by that directional filter to the original version of the visual image; and
      instructions for establishing the weight of the output from each directional filter in accordance with the difference between a prediction error for that directional filter and a minimum prediction error, wherein the prediction error is the difference between the filtered original version of the visual image produced by that directional filter and the original version of the visual image; and
   instructions for combining the weighted outputs from all of the directional filters to produce a filtered version of the visual image.

35. Apparatus for adaptively filtering a target version of a visual image that has been produced by processing an original version of the visual image, comprising:
   means for filtering the target version of the visual image with each of a plurality of directional filters;
   means for weighting the output of each of the plurality of directional filters, wherein the means for weighting further comprises:
      means for filtering the original version of the visual image with each of the plurality of directional filters;
      means for comparing, for each direct directional filter, the filtered original version of the visual image produced by that directional filter to the original version of the visual image; and
      means for establishing the weight of the output from each directional filter in accordance with the difference between a prediction error for that directional filter and a minimum prediction error, wherein the prediction error is the difference between the filtered original version of the visual image produced by that directional filter and the original version of the visual image; and
   means for combining the weighted outputs from all of the directional filters to produce a filtered version of the visual image.

* * * * *